United States Patent
Burdette et al.

(10) Patent No.: US 11,352,894 B2
(45) Date of Patent: Jun. 7, 2022

(54) VANE WITH COLLAR

(71) Applicant: UNITED TECHNOLOGIES CORPORATION, Farmington, CT (US)

(72) Inventors: Alyson T. Burdette, Glastonbury, CT (US); Bryan P. Dube, Columbia, CT (US); Rutva A. Patel, Middletown, CT (US); Nicholas Broulidakis, Vernon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 62 days.

(21) Appl. No.: 16/690,959

(22) Filed: Nov. 21, 2019

(65) Prior Publication Data

US 2021/0156270 A1    May 27, 2021

(51) Int. Cl.
*F01D 9/02*    (2006.01)

(52) U.S. Cl.
CPC ............ *F01D 9/02* (2013.01); *F05D 2220/32* (2013.01); *F05D 2300/20* (2013.01)

(58) Field of Classification Search
CPC . F01D 9/02; F01D 9/041; F01D 9/042; F01D 5/284; F05D 2300/20; F05D 2220/32; F05D 2240/12
See application file for complete search history.

(56) References Cited

U.S. PATENT DOCUMENTS

| | | | | |
|---|---|---|---|---|
| 5,630,700 | A * | 5/1997 | Olsen | F01D 9/042 415/134 |
| 6,196,794 | B1 * | 3/2001 | Matsumoto | B29C 66/1282 415/191 |
| 6,514,046 | B1 * | 2/2003 | Morrison | F01D 9/02 416/229 A |
| 6,648,597 | B1 | 11/2003 | Widrig et al. | |
| 7,600,979 | B2 * | 10/2009 | Steibel | C04B 35/62863 416/230 |
| 8,926,262 | B2 | 1/2015 | Tanahashi et al. | |
| 9,103,214 | B2 * | 8/2015 | McCaffrey | F01D 5/147 |
| 9,308,708 | B2 * | 4/2016 | Kleinow | B32B 18/00 |
| 9,803,486 | B2 | 10/2017 | Freeman et al. | |
| 10,309,240 | B2 | 6/2019 | Heitman et al. | |

(Continued)

FOREIGN PATENT DOCUMENTS

| EP | 3744949 | 12/2020 |
|---|---|---|
| WO | 2014133721 | 9/2014 |

OTHER PUBLICATIONS

European Search Report for European Patent Application No. 20208849.9, dated Apr. 15, 2021.

*Primary Examiner* — Courtney D Heinle
*Assistant Examiner* — Andrew Thanh Bui
(74) *Attorney, Agent, or Firm* — Carlson, Gaskey & Olds, P.C.

(57) ABSTRACT

An airfoil piece includes at least one inner ceramic matrix composite ply which defines an internal cavity of an airfoil section and first and second collar projections. At least one inner ceramic matrix composite ply is continuous through the airfoil section and first and second collar projections, first and second platforms at the first and second ends of the airfoil section. The first and second collar projections extend radially past the first and second platforms, respectively. A vane for a gas turbine engine and a method of assembling a vane are also disclosed.

18 Claims, 5 Drawing Sheets

(56) References Cited

U.S. PATENT DOCUMENTS

| | | | |
|---|---|---|---|
| 10,408,084 B2* | 9/2019 | Thomas | F01D 9/041 |
| 10,890,077 B2* | 1/2021 | Koenig | F01D 25/28 |
| 2012/0301315 A1* | 11/2012 | Alvanos | F01D 9/041 |
| | | | 416/230 |
| 2013/0004296 A1 | 1/2013 | Propheter-Hinckley et al. | |
| 2013/0142660 A1* | 6/2013 | McCaffrey | F01D 5/18 |
| | | | 416/241 B |
| 2019/0145269 A1* | 5/2019 | Campbell | F01D 9/041 |
| | | | 416/223 R |
| 2020/0109858 A1 | 4/2020 | Whittle | |
| 2020/0340363 A1 | 10/2020 | Whittle et al. | |
| 2020/0392049 A1* | 12/2020 | Razzell | C04B 41/4503 |
| 2020/0408100 A1* | 12/2020 | Whittle | F01D 25/005 |

* cited by examiner

VANE WITH COLLAR

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils in the turbine section are typically formed of a superalloy and may include thermal barrier coatings to extend temperature resistance. Ceramic matrix composite ("CMC") materials are also being considered for airfoils. Among other properties, CMCs have high temperature resistance and oxidation resistance.

SUMMARY

An airfoil piece, according to an example of this disclosure includes at least one inner ceramic matrix composite ply which defines an internal cavity of an airfoil section and first and second collar projections. The at least one inner ceramic matrix composite ply is continuous through the airfoil section and first and second collar projections. First and second platforms are at first and second ends of the airfoil section. The first and second collar projections extend radially past the first and second platforms, respectively.

In a further example of the foregoing, the airfoil piece includes a first outer ceramic matrix composite ply. The first outer ceramic matrix composite ply surrounds the inner ceramic matrix composite ply at the first collar projection and defines a radially outer surface of the first platform. The airfoil piece also includes a second outer ceramic matrix composite ply. The second outer ceramic matrix composite ply surrounds the inner ceramic matrix composite ply at the second collar projection and defines a radially inner surface of the second platform.

In a further example of any of the foregoing, a third outer ceramic matrix composite ply defines a radially inner surface of the first platform and a radially outer surface of the second platform, and surrounds the inner ceramic matrix composite ply.

In a further example of any of the foregoing, a middle ceramic matrix composite ply surrounds substantially the entire radial length of the inner ceramic matrix composite ply.

In a further example of any of the foregoing, the at least one inner ceramic matrix composite ply includes a first inner ceramic matrix composite ply which defines a first cavity and a second inner ceramic matrix composite ply which defines a second cavity.

In a further example of any of the foregoing, a middle ceramic matrix composite ply surrounds the first and second inner ceramic matrix composite plies to define the airfoil section.

In a further example of any of the foregoing, the first inner ceramic matrix composite ply comprises ceramic-based fibers in a ceramic-based matrix. At least some of the fibers are continuous through the first and second collar projections and the airfoil section.

In a further example of any of the foregoing, the first collar projection has a length in the radial dimension that is longer than a length of the second collar projection in the radial dimension.

A vane for a gas turbine engine according to an example of this disclosure includes an airfoil piece. The airfoil piece includes an inner ceramic matrix composite ply which defines an airfoil cavity. A middle ceramic matrix composite ply surrounds the inner ply. An outer ceramic matrix composite ply surrounds the middle ply. The outer ply defines first and second platforms. The inner and middle plies extend past the first and second platforms to form first and second collar projections, respectively. A spar piece includes a hollow spar situated in the airfoil cavity and a spar platform. The spar platform includes a pocket. The first collar projection is situated in the pocket.

In a further example of the foregoing, the first collar projection is a radially outer collar projection and the second collar projection is a radially inner collar projection.

In a further example of any of the foregoing, the first collar projection has a length in the radial dimension that is longer than a length of the second collar projection in the radial dimension.

In a further example of any of the foregoing, the outer ply is a first outer ply and the first outer ply defines a radially inner side of the first platform and a radially outer side of the second platform. A second outer ply defines a radially outer side of the first platform and a third outer ply defines a radially inner side of the second platform.

In a further example of any of the foregoing, the second and third outer plies surround the middle ply in the first and second collar projections, respectively.

In a further example of any of the foregoing, the airfoil cavity is a first airfoil cavity and the inner ply is a first inner ply, and the airfoil further includes a second airfoil cavity which is defined by a second inner ply. The middle ply surrounds the first and third plies.

In a further example of any of the foregoing, the spar piece is metallic.

In a further example of any of the foregoing, the spar piece is configured to transfer structural loads from the airfoil piece to a support structure.

A method of assembling a vane according to an example of this disclosure includes inserting a spar piece into a cavity of a hollow airfoil section of an airfoil piece. The cavity is defined by an inner ceramic matrix composite ply. A middle ceramic matrix composite ply surrounds the inner ply, and an outer ceramic matrix composite ply surrounds the middle ply. The outer ply defines first and second platforms. The inner and middle plies extend past the first and second platforms to form first and second collar projections.

In a further example of the foregoing, inserting includes aligning a pocket in a spar platform of the spar piece with the first collar projection.

In a further example of any of the foregoing, the outer ply is a first outer ply and the first outer ply defines a radially inner side of the first platform and a radially outer side of the second platform. A second outer ply defines a radially outer side of the first platform and a third outer ply defines a radially inner side of the second platform.

In a further example of any of the foregoing, the spar piece is metallic.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
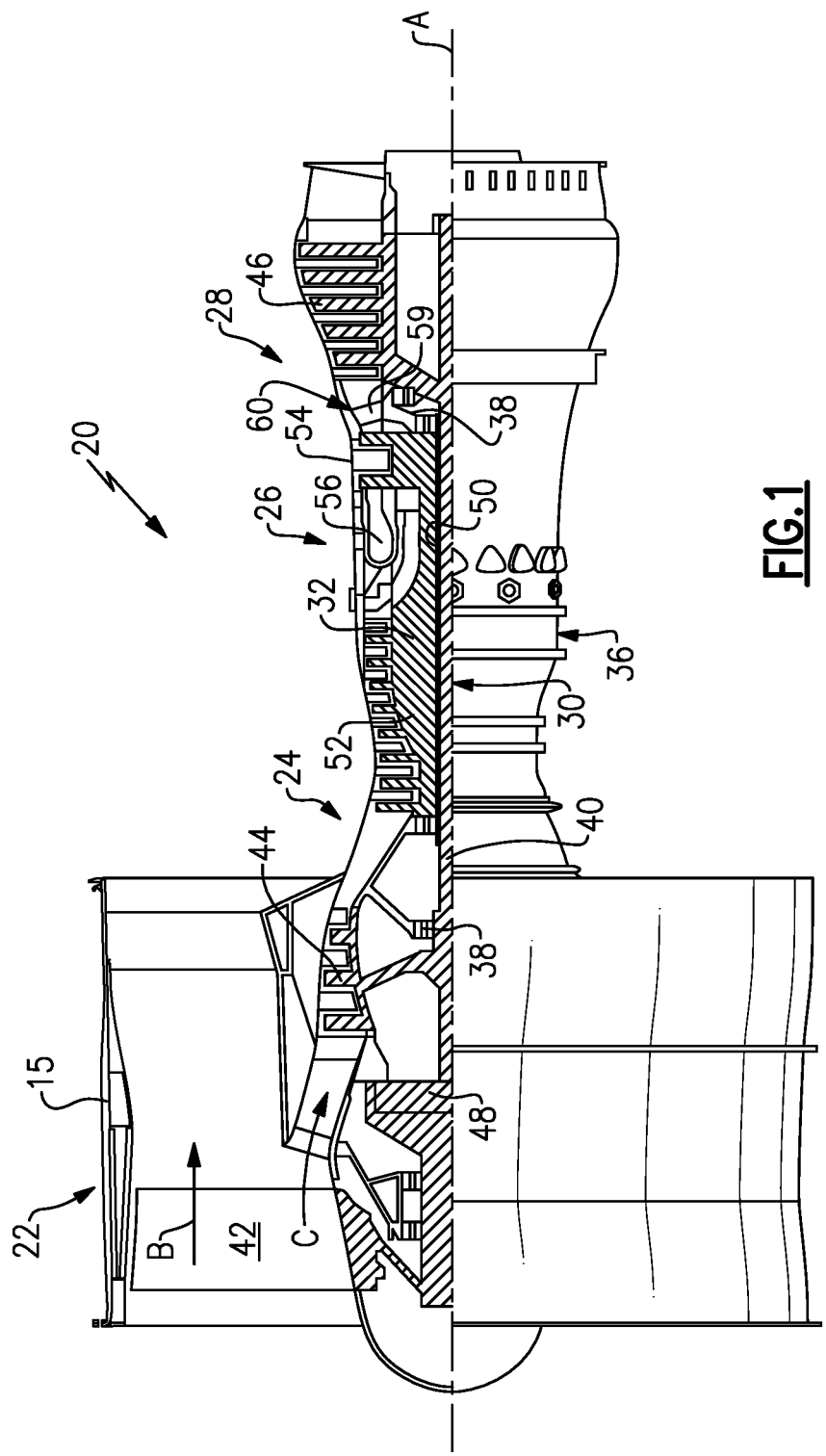
FIG. 1 schematically shows an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. Terms such as "axial," "radial," "circumferential," and variations of these terms are made with reference to the engine central axis A. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
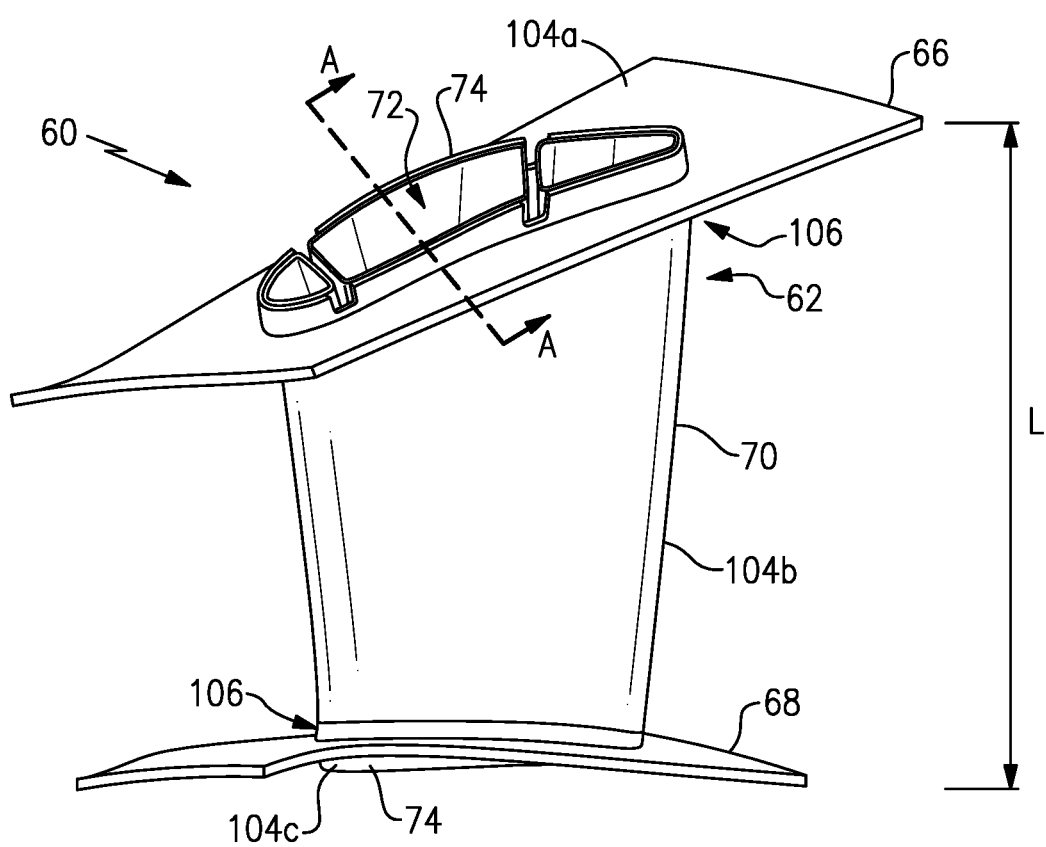
FIG. 2 schematically shows a vane airfoil assembly for the gas turbine engine of FIG. 1.
Figure 3A:
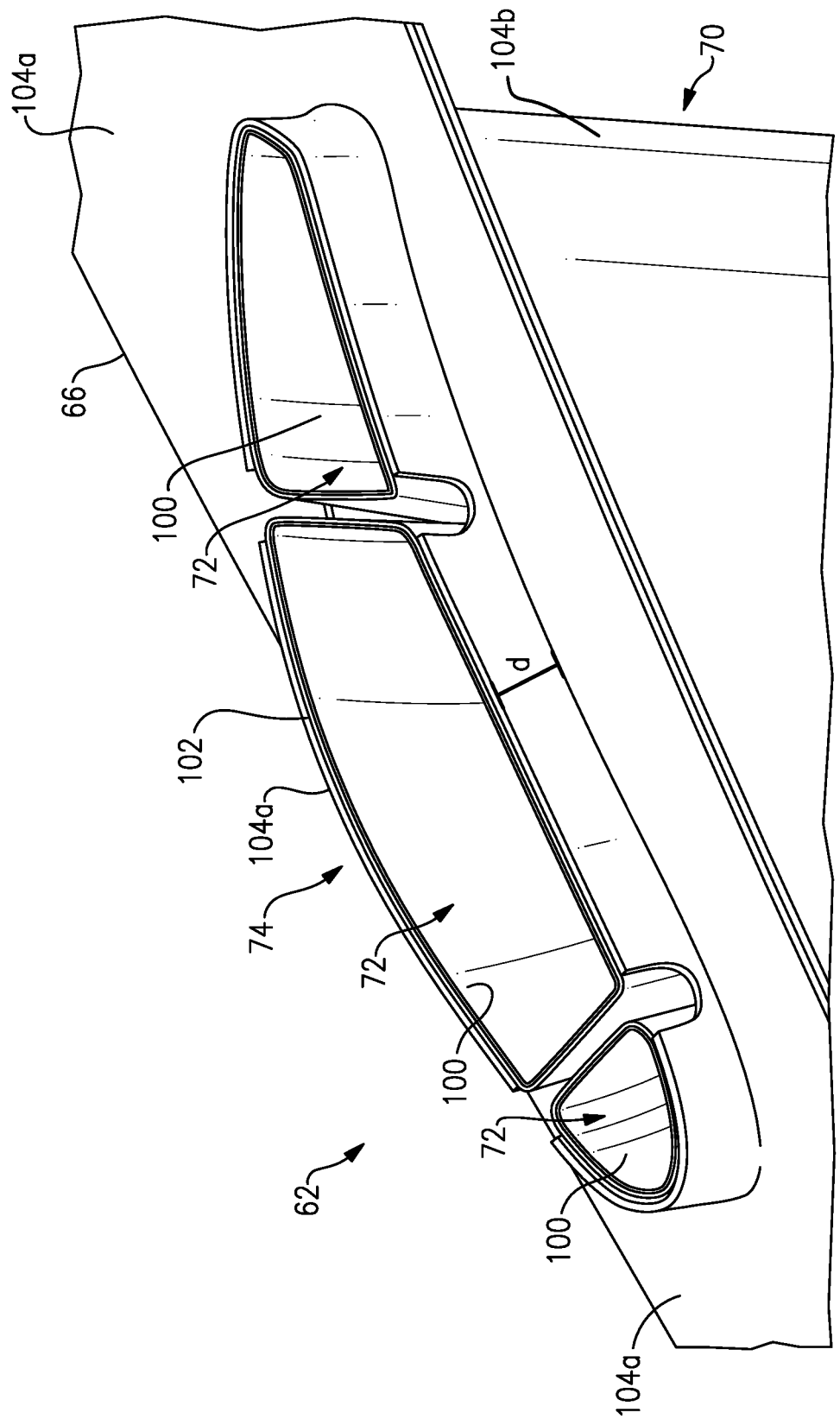
FIGS. 3A-B schematically show a detail view of a radially outer end of the vane airfoil assembly of FIG. 2.
Figure 3B:
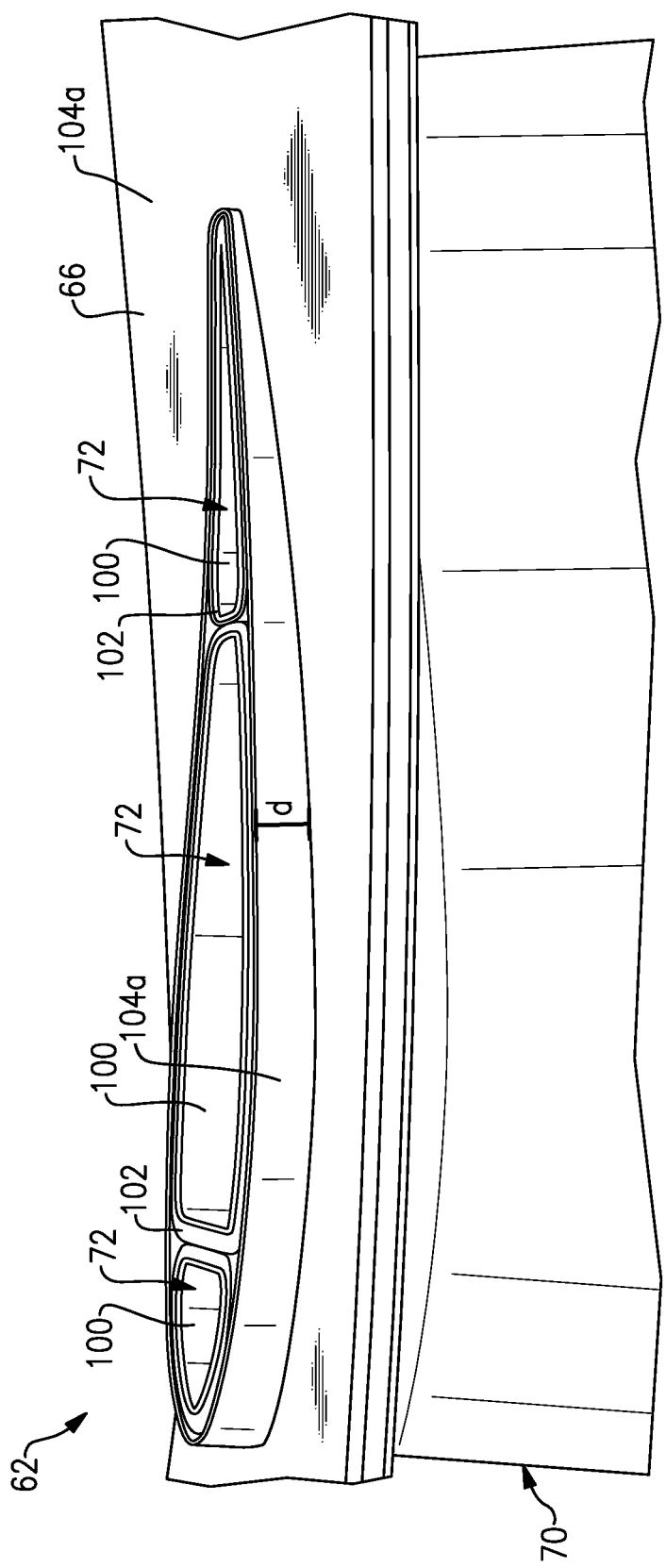
Figure 4:
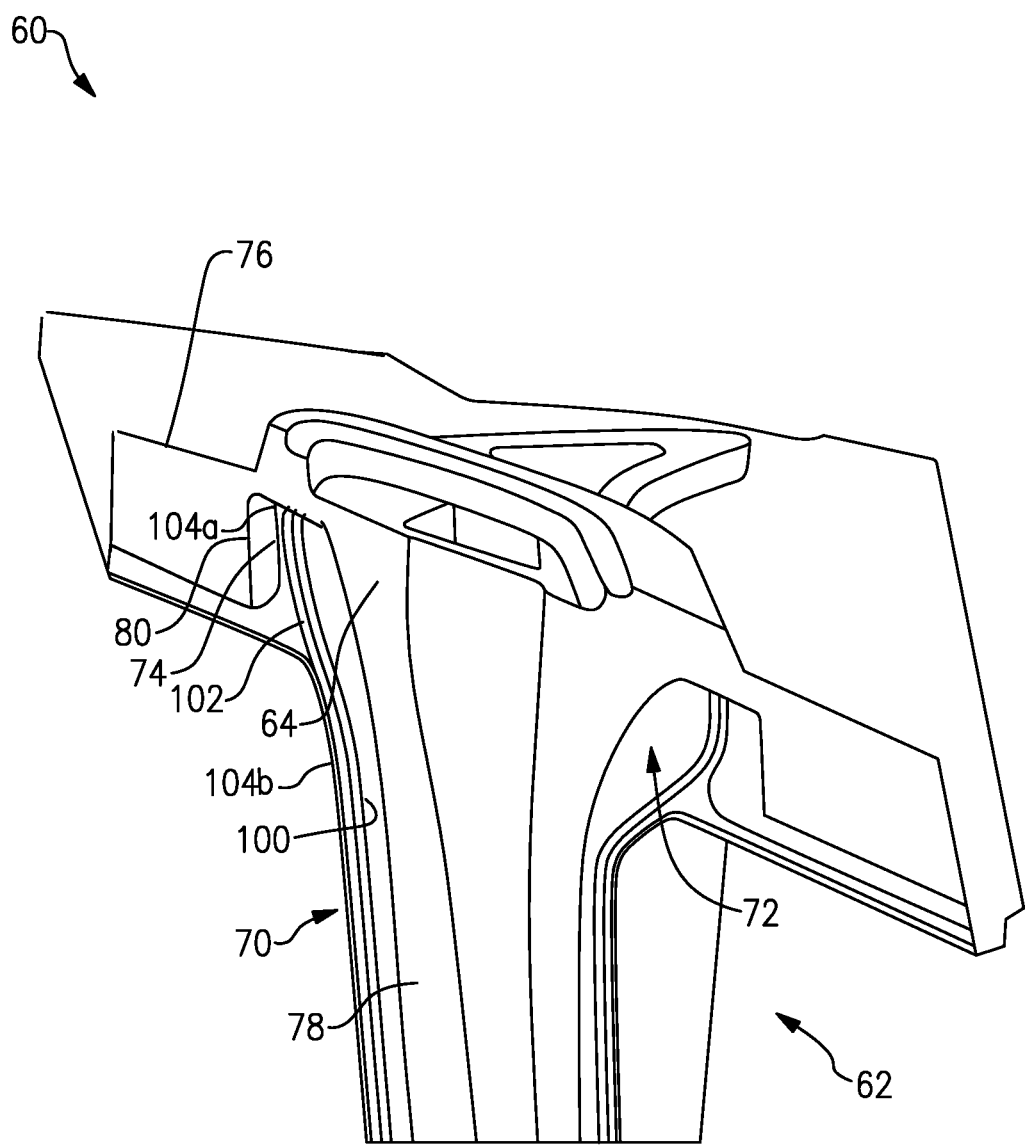
FIG. 4 schematically shows a cross-section of a radially outer end of the vane airfoil assembly of FIG. 2.

FIG. 2 illustrates a representative vane 60 from the turbine section 28 of the engine 20, although the examples herein may also be applied to vanes in the compressor section 24. A plurality of vanes 60 are situated in a circumferential row about the engine central axis A. FIGS. 3A-B show a detail view of a radially outer end of the vane 60, although it is to be appreciated that modified examples include the radially inner end. FIG. 4 shows a cross-sectional view of the radially outer end of the vane 60 taken along the section line A-A in FIG. 2.

The vane 60 is comprised of an airfoil piece 62 and a spar piece 64 (FIG. 4). The airfoil piece 62 includes several sections, including first (radially outer) and second (radially inner) platforms 66/68 and a hollow airfoil section 70 that joins the first and second platforms 66/68. The airfoil section 70 includes at least one cavity 72. In this example, there are three cavities 72 though in other examples more or less cavities 72 could be used. The airfoil section 70 extends beyond the first platform 66 to form a collar 74 that projects radially from the first platform 66, i.e. the collar projection 74 is an extension of the airfoil section from the first platform 66 and thus continues the shape profile of the airfoil section. As shown in FIG. 2, the inner platform 68 can also include a collar projection 74. The terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

The airfoil piece 62 may be formed of a metallic material, such as a nickel- or cobalt-based superalloy, but more typically will be formed of a ceramic. The ceramic may be a ceramic matrix composite ("CMC"). Example ceramic materials may include, but are not limited to, silicon-containing ceramics. The silicon-containing ceramic may be, but is not limited to, silicon carbide (SiC) or silicon nitride ($Si_3N_4$). An example CMC may be a SiC/SiC CMC in which SiC fibers are disposed within a SiC matrix. The CMC may be comprised of fiber plies that are arranged in a stacked configuration and formed to the desired geometry of the airfoil piece 62. For instance, the fiber plies may be layers or tapes that are laid-up one on top of the other to form the stacked configuration. The fiber plies may be woven, unidirectional, knitted, or braided, for example. In one example, at least a portion of the fiber plies may be continuous through the first platform 66, the airfoil section 70, and the second platform 68. In this regard, the airfoil piece 62 may be continuous in that at least some of the fiber plies are uninterrupted through the first platform 66, the airfoil section 70, and the second platform 68, as discussed in more detail below. In alternate examples, the airfoil piece 62 may be discontinuous such that the first platform 66, the airfoil section 70, and/or the second platform 68 are individual sub-pieces that are attached to the other sections of the airfoil piece 62 in a joint.

The spar piece 64 defines a spar platform 76 and a (hollow) spar 78 that extends from the spar platform 76 into the hollow airfoil section 70. For example, the spar piece 64 is formed of a metallic material, such as a nickel- or cobalt-based superalloy, and is a single, monolithic piece. The spar piece 64 includes a radial pocket 80 which receives the collar projection 74. The spar piece 64 is configured to connect to a support structure (not shown) of the engine 20. The spar piece 64 bears structural loads from the airfoil piece 62 during operation of the engine 20. In particular, the airfoil piece 62 transfers loads directly to the spar piece 64 via the interaction of the collar projection 74 and the pocket 80 in the spar platform 76. The platform 66/68 and collar projections 74 also act as a heat shield for the spar platform 76.

As best shown in FIGS. 3A-B, the airfoil piece 62 includes multiple plies of CMC material, as discussed above. The plies are formed and joined together by any known manner. Furthermore, the plies can be formed of the same or different materials. It should be understood that the plies discussed herein can also be sets of multiple plies, in other examples.

Inner plies 100 define each cavity 72. The inner plies 100 can be shaped to define the cavity 72 by being formed on a mandrel, as would be known in the art. As shown, the inner plies 100 are continuous though the entire radial length of the airfoil piece 62, including the collar projections 74 and the airfoil section 70. A middle ply 102 (FIG. 3B) surrounds substantially the entire length of the inner ply 100 to define the outer shape of the airfoil section 70, join the individual inner plies 100 together, and provide structural integrity to the airfoil piece 62. Like the inner plies 100, the middle ply 102 is continuous though the entire radial length of the airfoil piece 62, including the collar projections 74 and the airfoil section 70. The continuous nature of the inner plies 100 and middle ply 102 improves the strength of the airfoil piece 62 so that it can withstand and transfer loads directly to the spar piece 64 as discussed above. As discussed above, the plies include ceramic-based fibers in a ceramic-based matrix. In one example, the continuous plies include at least some fibers that are continuous though the entire radial length of the airfoil piece 62, including the collar projection 74 and the airfoil section 70. That is, the continuous plies include at least some continuous fibers that have a portion disposed in the collar projection 74 at one or both platforms 66/68 and a portion disposed in the airfoil section 70. In a particular example, one or both of the inner and middles plies 100/102 comprise ceramic-based fibers arranged in triaxial braids as would be known in the art (though other fiber arrangements are also contemplated). In this example, at least some of the triaxial braids are continuous though the entire radial length of the airfoil piece 62, including the collar projections 74 and the airfoil section 70.

Outer plies define the outermost surfaces of the airfoil piece 62 and platforms 66/68. Outer plies includes a first outer ply 104a, which defines a radially outer surface of the platform 66 and surrounds the second ply 102 in the collar projection 74. A second outer ply 104b defines a radially inner surface of the platform 66, a radially outer surface of the platform 68, and an outermost surface of the airfoil section 70. In this regard, the second outer ply 104b is continuous through the airfoil section 70 and platform 66/68, as discussed above. Again, the continuous nature of the ply 104b provides an improved strength for the airfoil section 70 and platforms 66/68. A third outer ply 104c defines a radially inner surface of the platform 68 (FIG. 2) and surrounds the middle ply 102 in the collar projection 74. Thus the collar projection 74 in the platform 66 is made up of the inner plies 100, middle ply 102, and first outer ply 104a. Likewise the collar projection 74 in the platform 68 is made up of the first plies 100, middle ply 102, and third outer ply 104c. It should be understood, however, that more plies could be arranged between the specific plies discussed herein.

The collar projection 74 has a length d defined in the radial dimension. In one example, the collar projection 74 at the radially outer platform 66 has a greater length d than the collar projection 74 at the radially inner platform 68. The thermal gradients discussed above are generally more pronounced at the radially outer end of the vane 60 as compared to the radially inner end. Accordingly, the larger collar projection 74 at the radially outer platform 66 better mitigates the temperature gradient across the vane 60 as discussed above. In a particular example, the length d of the collar projection 74 at the outer platform 66 is between about 2 and 10% of the radial length L of the airfoil piece 62 (shown in FIG. 2 as the length between platforms 66/68) and the length d of the collar projection 74 at the inner platform 68 is between about 2 and 10% of the radial length L. In another particular example, a ratio of the length d of the collar projection 74 at the outer platform 66 and the length d of the collar projection 74 at the inner platform is about 2:1.

The vane 60 is assembled by inserting the spar piece 64 into the airfoil piece 62. The assembly includes aligning the pocket 80 with the collar projection 74 such that the collar projection 74 extends into the pocket 80 when the vanes 60 are assembled.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An airfoil piece, comprising:
at least one inner ceramic matrix composite ply defining an internal cavity of an airfoil section and first and second collar projections, the at least one inner ceramic matrix composite ply continuous through the airfoil section and first and second collar projections;
first and second platforms at first and second ends of the airfoil section, wherein the first and second collar projections extend radially past the first and second platforms, respectively, wherein the first collar projection has a length in the radial dimension that is longer than a length of the second collar projection in the radial dimension.

2. The airfoil piece of claim 1, further comprising:
a first outer ceramic matrix composite ply, the first outer ceramic matrix composite ply surrounding the inner ceramic matrix composite ply at the first collar projection and defining a radially outer surface of the first platform; and
a second outer ceramic matrix composite ply, the second outer ceramic matrix composite ply surrounding the inner ceramic matrix composite ply at the second collar projection and defining a radially inner surface of the second platform.

3. The airfoil piece of claim 2, further comprising a third outer ceramic matrix composite ply defining a radially inner surface of the first platform and a radially outer surface of the second platform, and surrounding the inner ceramic matrix composite ply.

4. The airfoil piece of claim 3, further comprising a middle ceramic matrix composite ply surrounding substantially the entire radial length of the inner ceramic matrix composite ply.

5. The airfoil piece of claim 1, wherein the at least one inner ceramic matrix composite ply includes a first inner ceramic matrix composite ply defining a first cavity and a second inner ceramic matrix composite ply defining a second cavity.

6. The airfoil piece of claim 5, further comprising a middle ceramic matrix composite ply surrounding the first and second inner ceramic matrix composite plies to define the airfoil section.

7. The airfoil piece of claim 1, wherein the first inner ceramic matrix composite ply comprises ceramic-based fibers in a ceramic-based matrix, and at least some of the fibers are continuous through the first and second collar projections and the airfoil section.

8. A vane for a gas turbine engine, comprising:
an airfoil piece, including:
an inner ceramic matrix composite ply defining an airfoil cavity;
a middle ceramic matrix composite ply surrounding the inner ceramic matrix composite ply; and
an outer ceramic matrix composite ply surrounding the middle ply, the outer ply defining first and second platforms, wherein the inner and middle plies extend past the first and second platforms to form first and second collar projections, respectively, wherein the first collar projection has a length in the radial dimension that is longer than a length of the second collar projection in the radial dimension; and
a spar piece, the spar piece including a hollow spar situated in the airfoil cavity and a spar platform, the spar platform including a pocket, wherein the first collar projection is situated in the pocket.

9. The vane of claim 8, wherein the first collar projection is a radially outer collar projection and the second collar projection is a radially inner collar projection.

10. The vane of claim 8, wherein the outer ply is a first outer ply and the first outer ply defines a radially inner side of the first platform and a radially outer side of the second platform, and further comprising a second outer ply defining a radially outer side of the first platform and a third outer ply defining a radially inner side of the second platform.

11. The vane of claim 10, wherein the second and third outer plies surround the middle ply in the first and second collar projections, respectively.

12. The vane of claim 8, wherein the airfoil cavity is a first airfoil cavity and the inner ceramic matrix composite ply is a first inner ply, and further comprising a second airfoil cavity defined by a second inner ply, wherein the middle ply surrounds the first and second inner plies.

13. The vane of claim 8, wherein the spar piece is metallic.

14. The airfoil vane of claim 8, wherein the spar piece is configured to transfer structural loads from the airfoil piece to a support structure.

15. A method of assembling a vane, comprising:
inserting a spar piece into a cavity of a hollow airfoil section of an airfoil piece, the cavity defined by an inner ceramic matrix composite ply, wherein a middle ceramic matrix composite ply surrounds the inner ceramic matrix composite ply, and an outer ceramic matrix composite ply surrounds the middle ply, the outer ply defining first and second platforms, wherein the inner and middle plies extend past the first and second platforms to form first and second collar projections, wherein the first collar projection has a length in the radial dimension that is longer than a length of the second collar projection in the radial dimension.

16. The method of claim 15, wherein the inserting includes aligning a pocket in a spar platform of the spar piece with the first collar projection.

17. The method of claim 16, wherein the outer ply is a first outer ply and the first outer ply defines a radially inner side of the first platform and a radially outer side of the second platform, and further comprising a second outer ply defining a radially outer side of the first platform and a third outer ply defining a radially inner side of the second platform.

18. The method of claim 15, wherein the spar piece is metallic.

* * * * *